Patented Mar. 14, 1939

2,150,329

UNITED STATES PATENT OFFICE 2,150,329

METHOD OF PROPAGATION OF CULTURE YEAST

Edmund Leith Kitzmeyer, Bloomfield, N. J.

No Drawing. Application November 3, 1934,
Serial No. 751,281

1 Claim. (Cl. 195—82)

This invention relates to a method of controlling the growth and nutrition of microorganisms used in industrial processes. It relates more particularly to the growth, nutritional and environmental influences upon yeasts, particularly culture yeasts used to initiate the manufacture of a commercial compressed yeast, such as is used in baking.

An object of this invention is to maintain the most desirable physiological state of the cultured microorganism, with a simple manner of manipulation which does not greatly risk contamination of pure cultures by extraneous organisms.

Another object of this invention is to bestow upon culture yeast such nutritional and physiological properties that when it is subsequently increased in quantity by any of the common manufacturing processes, the resultant large quantity of yeast will be of a better yield and an improved quality.

Another object of this invention is to accomplish these aims without any extra cost or effort more than that which is expended in previously known methods of handling cultures of industrial organisms.

Still another object of this invention is to treat yeast in such a manner that its hereditary tendencies will be so altered that it may be increased in quantity in excess of several billion times and still maintain improved characteristics.

At one time in the yeast manufacturing industry it was customary to initiate the growth of yeast by placing a small portion of previously manufactured yeast in a suitable quantity of nutrient and increase the yeast in quantity by the regular manufacturing process. Due to the fact that this often caused the yeast to become infected with wild yeasts and other organisms, this method has been generally abandoned.

The present practice of handling yeast to be used to start the manufacturing process is similar to that employed in the routine handling of other bacteriological cultures. The pure culture of yeast is obtained by known methods, and is kept alive by transfer in liquid media such as malt, other grain, or molasses solutions, or by growth on solid media preparations of agar or gelatine. The media are sterilized and the technique of transfer is that well known to bacteriologists.

If solid media are employed they are kept in a tube or small vessel protected from infection by a cotton plug. The yeast is introduced in very small quantity on a platinum wire, and the medium is kept at proper temperature until yeast growth is complete. Then the culture may be transferred to a fresh medium or may be kept for some time in a cool place before transfer to another similar tube, or to the vessel in which is started the first stage of the yeast manufacturing process. As the yeast grows on the surface of the solid medium, the increasing cells pile on top of one another and crowd along at the sides of the colony so that the individual cells of the culture are subjected to a changing and wide variety of conditions of moisture, nutrient concentration, alcohol, waste products, air and carbon dioxide. Most of the cells are subjected during most of their existence as units to an environment of small amounts of nutrient and large amounts of yeast meltabolic waste products and are not in a state of active reproduction.

If liquid media are employed, the liquid containing all essential yeast nutrients at a concentration of from 8° Balling to 20° Balling is maintained in sterile condition in tubes or other vessels. An inoculation of yeast culture is added with a platinum wire or sterile pipette and the tube is kept at a proper temperature until the growth of yeast is complete. If it is desired to keep this culture several days before the next transfer, the culture is sometimes placed in a refrigerator. Under these conditions the yeast cells at first receive an excess of nutrient but as growth continues they are subjected for long periods to an environment in which there is little nutrient, large amounts of alcohol and other yeast metabolic waste products, as well as the anaerobic condition caused by super-saturation of the liquid with carbon dioxide.

With the older methods of caring for baker's yeast cultures there are apt to appear, amongst the normal cells, an occasional large, round, very granular cell which has a diameter of from two to five times that of the normal cells, and sometimes there appear some abnormal, elongated, very granular cells. These dissociated rough cells, when obtained in pure culture produce a gray appearing yeast of slow growth rate, forming unusually fine bubbles of foam in usual media. These cells have a tendency to autolyze, and when used to start a yeast manufacturing process produce a compressed yeast of poorer yield and slower dough fermentation time, though sometimes producing bread of finer grain. This yeast is of somewhat darker color and has an increased tendency toward grittiness when compressed. I have found that even if the cells remain of the smooth, apparently normal type they are subject to the influence of their environment and retain certain peculiarities derived there-from, for countless generations of reproduction under new conditions.

I have discovered a method of caring for yeast cultures which will maintain the yeast in such a condition that when the culture is used to start a manufacturing process the resultant compressed yeast will show a higher yield, a faster dough fermentation time, a better keeping quality and a better color. I have further found a simple method of maintaining baker's yeast cultures under such conditions that they will maintain indefinitely their ability to reproduce into compressed yeast of the desired qualities.

In the practice of my invention we may use the regular liquid media tubes now employed in the growth of cultures, for example a 13° Balling malt wort tube adjusted to a pH of 5.00. A pure strain culture may be used or a mixed culture such as "Rasse M" may be employed. A platinum wire inoculation is placed in the tube and incubated at any of the usual temperatures, for example 28° C. As soon as the first active evolution of carbon dioxide appears, the tube is agitated to drive off excess carbon dioxide and a straight platinum wire inoculation is made into a fresh tube; and this in turn is transferred as soon as carbon dioxide is actively produced.

This procedure may readily be adjusted so that the tubes need transfer every 24 hours, by being careful to what depth the platinum wire is dipped into the tube being inoculated. Or the time between transfers may be still further varied by changing the incubation temperature or the quantity of the culture medium. In no case have I found it desirable to cause the yeast to grow until the nutrient is exhausted as is the common practice. By my partial growth method of transfer, the yeast is continuously held in a medium rich in all yeast nutrients, and is never exposed to any high concentrations of alcohol or other yeast metabolic waste products. The yeast is in a continual state of reproduction and when there develops any difference between the many cells of the culture it is the fastest growing ones that will survive the serial transfer. At each new transfer the yeast is placed in a fresh aerobic environment, and a considerable part of the cycle between transfers has elapsed before enough carbon dioxide has been evolved to approach anaerobic conditions. Although the amount of inoculating material is small, the lag period of growth rate is greatly reduced due to the high state of activity of the inoculated cells.

The beneficial effects of this method of care of culture yeasts cannot be explained entirely by the nutritional state of the culture, but must be attributed rather to an evolutionary alteration, since the effects are distinguishable so many generations after any chemical constituents would have been diluted to the vanishing point by cell reproductions.

Thus if we take from one pure culture of yeast, two inoculations to be run in two sets of tubes containing the same media we may trace certain fundamental differences in effects. The one culture may be transferred by the old method, that is, transferred with a loop or pipette three or four times a week, the yeast being allowed to thoroughly "grow out" between each transfer, and the other culture transferred by my partial growth method which I have described. As we carry these cultures we will note at time of transfer that the old method culture has cells tending to be rounded, vacuoled with somewhat granular cytoplasms, and a number of dead cells may be seen as well as an occasional rough dissociated cell, while the partial growth culture noted at time of transfer has cells tending to elongate in active reproduction, showing smooth cytoplasms, no vacuoles and dead cells, and dissociated cells are almost entirely absent.

If we grow these cultures for four or five months, we may then use them to start a commercial yeast manufacturing process in which to compare results. In the commercial process these two cultures will present similar appearances except that the partial growth culture will tend to produce a thicker, whiter foam containing more yeast. But in the resultant compressed yeast certain fundamental differences may be noted. If control of all steps is accurately maintained, the partial growth culture will be found to have produced from 1% to 4% more yeast than the old method culture. Chemical tests will show that the partial growth culture has been able to extract a greater percentage of nitrogen from the nutrient wort. The compressed yeast from the partial growth culture will show a slightly improved color and slightly better keeping quality. Equal weights of the compressed yeast from these two cultures, when used in representative types of dough, will show that the partial growth culture yeast will definitely shorten the dough fermentation time by a considerable percentage, and will produce a baked product of better quality than will the compressed yeast from the old method culture.

This description of my partial growth method of culture transfer is given as an illustration of a simple, safe and inexpensive method of applying the principles which I have discovered. Other methods of manipulation which arrive at the result which I have accomplished will be seen to lie within the scope of this invention. It is obvious that I present a novel practice in the care of culture yeast in the fact of always keeping all cells, the offspring of which are to be subsequently used, in an environment rich in sugar, nitrogen, phosphate and all other yeast nutrients. It will be noted that I present further novelty in the continuous maintenance of culture yeast in an environment very low in alcohol, carbon dioxide, and other yeast waste products. It will be seen that I present further novelty in keeping culture yeast in a state of perpetual reproduction. It may be seen that I reveal a new discovery in the fact that yeast may be influenced into hereditary changes of an evolutionary nature, and that the successful application of these hereditary changes to a manufacturing process involves an important invention. Since this invention accomplishes such marked benefits in quality and yield without any extra cost it will be seen to be of great commercial value.

The invention here described is not limited to the transfer of tube cultures of yeast with a straight platinum wire. The nutrient wort may be contained in any sort of a flask or vessel and the transfer made by any device which avoids infection.

Procedures in culture care, such as replacement of nutrient as it is used, physical or chemical removal, dilution or neutralization of metabolic waste products, or retardation of growth rate by low temperatures, high acid concentrations or unbalanced nutrients will be seen to comprise more cumbersome methods of employing some of the principles which I have explained.

Partial growth cultures in flasks may be aerated by bubbling filtered air through the nutrient wort. If this procedure is followed, it is not possible by simple observation to tell when the first active evolution of carbon dioxide occurs, so that the time for transfer may be determined, but the following method may be followed with good results. A flask is inoculated with the culture, standard conditions of quantity of inoculating material, quantity and concentration of nutrient, temperature, and aeration being selected. The yeast is allowed to propagate and the degrees Balling of the nutrient wort are tested and recorded from time to time. This test of the fermentation of the sugar will supply a sufficiently accurate standard upon which to base a regular procedure of transfer. It will be noted that the destruction of nutrient and rise in waste products of the medium occurs at a greatly increasing rate during growth, due to the geometric progression of the number of yeast cells, and that volatile waste products such as carbon dioxide and alcohol will be partly removed by the passage of air through the flask. Due to these facts, it is safe to transfer the culture, in accordance with the partial growth principles, on a regular schedule at any time between the time when the first definite drop in degrees Balling occurs, and the time when three quarters of the time from the setting to the time of the lowest degree Balling has elapsed. Thus if the nutrient in the standard flask showed its first definite drop in Balling at 10 hours and reached its lowest degree Balling at 32 hours, it would be proper to make the regular routine transfer of such flasks at any time between 10 and 24 hours without any necessity of performing tests.

These principles may be applied to the continuance of culture yeast into the early part of the plant manufacturing process, that is, the steps used in the manufacture of seed yeast. Just how far this may be carried efficiently will depend upon the particular process and conditions in the particular plant. As an illustration we may take 5 c. c. of a partial growth culture started at 13° Balling, and add it to one gallon of 13° Balling nutrient wort. When partial growth has occurred, we may add this to 100 gallons of aerated 10° Balling nutrient wort, and this in turn when partially grown may be run into 800 gallons of aerated 6° Balling nutrient. Before the yeast exhausts this sugar, this solution may be added to 2,500 gallons of aerated 4° Balling wort. When proper partial growth has taken place in this fermenting liquid, it may be used to set 5,000 gallons of aerated 3° Balling wort. Here the yeast may be allowed to complete its growth, with subsequent addition of nutrient, or at this or at any stage, the partial growth yeast may be filtered or separated to start the next fermentation stage, and the unused nutrient of the wort may be used as part of the nutrient for a commercial yeast propagation. Thus the partial growth principle may be efficiently applied in yeast manufacture, in any stage from the culture tube to the start of the commercial yeast propagation.

This partial growth principle may be applied to other micro-organisms than yeast with similar success wherever the organisms are used in any comparable function in industrial processes. Wherever bacteria or other fungi are used in considerable quantity to perform some chemical industrial function, this partial growth method of transfer of cultures will be found valuable. In each case the culture medium must be adjusted to meet the particular needs of nutrient, moisture, temperature, etc., of the particular organisms, but if the general conditions of optimum concentration of nutrient, low concentration of waste products and continuous cell reproduction are adhered to for protracted periods, the culture will be found to have improved inherently in growth capabilities and vitality of function.

What I desire to secure by United States Letters Patent is:

The method of propagating pure yeast cultures which comprises growing said cultures in a normal yeast nutrient solution, and repeatedly transferring said cultures from solution to solution at a period between the time the sugar first shows readily appreciable depletion and the time when three-quarters of the growth time has elapsed.

EDMUND LEITH KITZMEYER.